US012612059B2

(12) United States Patent
Ohashi et al.

(10) Patent No.: US 12,612,059 B2
(45) Date of Patent: Apr. 28, 2026

(54) MOTION MANAGER, CONTROL METHOD, AND NON-TRANSITORY STORAGE MEDIUM

(71) Applicants: TOYOTA JIDOSHA KABUSHIKI KAISHA, Toyota (JP); J-QuAD DYNAMICS INC., Tokyo (JP); ADVICS CO., LTD., Kariya (JP)

(72) Inventors: Yuta Ohashi, Toyota (JP); Tatsuya Hiromura, Tokyo (JP)

(73) Assignees: TOYOTA JIDOSHA KABUSHIKI KAISHA, Toyota (JP); J-QUAD DYNAMICS INC., Nihonbashi (JP); ADVICS CO., LTD., Kariya (JP)

( * ) Notice: Subject to any disclaimer, the term of this patent is extended or adjusted under 35 U.S.C. 154(b) by 100 days.

(21) Appl. No.: 18/629,561

(22) Filed: Apr. 8, 2024

(65) Prior Publication Data
US 2024/0343255 A1 Oct. 17, 2024

(30) Foreign Application Priority Data
Apr. 13, 2023 (JP) ................................. 2023-065737

(51) Int. Cl.
*B60W 50/029* (2012.01)

(52) U.S. Cl.
CPC ... *B60W 50/029* (2013.01); *B60W 2050/0295* (2013.01); *B60W 2720/106* (2013.01)

(58) Field of Classification Search
None
See application file for complete search history.

(56) References Cited

U.S. PATENT DOCUMENTS

| | | | |
|---|---|---|---|
| 2020/0035098 A1* | 1/2020 | Vozar ................ | B60W 50/0205 |
| 2020/0070849 A1 | 3/2020 | Suzuki et al. | |
| 2022/0212684 A1* | 7/2022 | Lee ......................... | B60W 30/18 |
| 2022/0219688 A1* | 7/2022 | Ito ......................... | B60W 50/14 |
| 2022/0289199 A1* | 9/2022 | Sun ............................ | B60T 7/18 |
| 2024/0326876 A1* | 10/2024 | Sasayama ................ | G08G 1/16 |

FOREIGN PATENT DOCUMENTS

JP          2020-032894 A          3/2020

* cited by examiner

*Primary Examiner* — Amelia Vorce
(74) *Attorney, Agent, or Firm* — Oliff PLC

(57) ABSTRACT
A motion manager for a vehicle includes one or more processors. The one or more processors are configured to: receive acceleration request values from a plurality of applications and driver assistance levels associated with the respective acceleration request values; select the highest driver assistance level of the driver assistance levels received; select the smallest acceleration request value of the acceleration request values associated with the selected driver assistance level; output a specified value according to the selected acceleration request value to an actuator of the vehicle; and stop the output of the specified value under a condition according to the selected driver assistance level.

6 Claims, 2 Drawing Sheets

MOTION MANAGER, CONTROL METHOD, AND NON-TRANSITORY STORAGE MEDIUM

CROSS-REFERENCE TO RELATED APPLICATION

This application claims priority to Japanese Patent Application No. 2023-065737 filed on Apr. 13, 2023, incorporated herein by reference in its entirety.

BACKGROUND

1. Technical Field

The present disclosure relates to a motion manager, a control method, and a non-transitory storage medium.

2. Description of Related Art

The vehicle control system disclosed in Japanese Unexamined Patent Application Publication No. 2020-032894 (JP 2020-032894 A) includes a plurality of execution units, a motion manager, and an actuator. The execution units each execute a separate application. The motion manager receives motion requests from a plurality of applications. The motion manager arbitrates among these plurality of motion requests. That is, the motion manager selects one of the motion requests in accordance with a predetermined rule. Then, the motion manager generates a specified value for the actuator based on the motion request that has won the arbitration.

SUMMARY

A driver assistance level is specified for each of applications relating to driver assistance of the vehicle. The motion manager continues or stops the control according to a motion request from an application depending on whether this driver assistance level is high or low. When the driver assistance level is high, the motion manager continues the control according to the motion request from the application regardless of the vehicle's state. On the other hand, when the driver assistance level is low, the motion manager stops the control according to the motion request from the application according to the vehicle's state. For example, suppose that an acceleration request has been made as a motion request from an application with a low driver assistance level. In this case, in response to occurrence of a malfunction in the vehicle, the motion manager brings the requested value of acceleration closer to a predetermined end value as time passes. Finally, the motion manager stops the control according to the motion request.

Here, it is assumed that, as a result of arbitration among motion requests from a plurality of applications, a motion request from an application with a low driver assistance level has won the arbitration. In this case, the motion manager stops the control according to the motion request depending on the vehicle's state at the time. However, even among situations such as where a motion request from an application with a low driver assistance level wins the arbitration, there can be situations where the actuator should be controlled based on the motion request from the application without the control of the actuator being ended.

A first aspect of the present disclosure is a motion manager for a vehicle including one or more processors. The one or more processors are configured to: receive acceleration request values from a plurality of applications and driver assistance levels associated with the respective acceleration request values; select the highest driver assistance level of the driver assistance levels received; select the smallest acceleration request value of the acceleration request values associated with the selected driver assistance level; output a specified value according to the selected acceleration request value to an actuator of the vehicle; and stop the output of the specified value under a condition according to the selected driver assistance level.

In the first aspect, regarding stopping the output of the specified value, a stricter condition for stopping the output of the specified value may be set when the selected driver assistance level is higher.

In the first aspect, regarding stopping the output of the specified value, the one or more processors may be configured to, when the selected driver assistance level is the highest of the driver assistance levels associated with the respective applications that the vehicle has, continue and not stop the output of the specified value even when a malfunction is present in the vehicle. Regarding stopping the output of the specified value, the one or more processors may be configured to, when the selected driver assistance level is a specific level that is lower than the highest level, stop the output of the specified value on the condition that a malfunction occurs in the vehicle.

In the first aspect, the one or more processors may be configured to stop the output of the specified value, when the condition according to the selected driver assistance level is met, by bringing the selected acceleration request value closer to a predetermined end value as time passes.

A second aspect of the present disclosure is a control method for a vehicle. The control method is executed by one or more processors in a computer installed in the vehicle. The control method includes receiving acceleration request values from a plurality of applications and driver assistance levels associated with the respective acceleration request values; selecting the highest driver assistance level of the driver assistance levels received; selecting the smallest acceleration request value of the acceleration request values associated with the selected driver assistance level; outputting a specified value according to the selected acceleration request value to an actuator of the vehicle; and stopping the output of the specified value under a condition according to the selected driver assistance level.

A third aspect of the present disclosure is a non-transitory storage medium storing instructions that are executable by one or more processors in a computer installed in a vehicle and that cause the one or more processors to perform the following functions. The functions include: receiving acceleration request values from a plurality of applications and driver assistance levels associated with the respective acceleration request values; selecting the highest driver assistance level of the driver assistance levels received; selecting the smallest acceleration request value of the acceleration request values associated with the selected driver assistance level; outputting a specified value according to the selected acceleration request value to an actuator of the vehicle; and stopping the output of the specified value under a condition according to the selected driver assistance level.

According to the first aspect, the second aspect, and the third aspect described above, the likelihood of the output of the specified value according to the acceleration request value being stopped can be reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

One embodiment of a vehicle motion manager, a vehicle control method, and a non-transitory storage medium storing programs for a vehicle will be described below with reference to the drawings.

Overall Configuration of Vehicle

Figure 1:
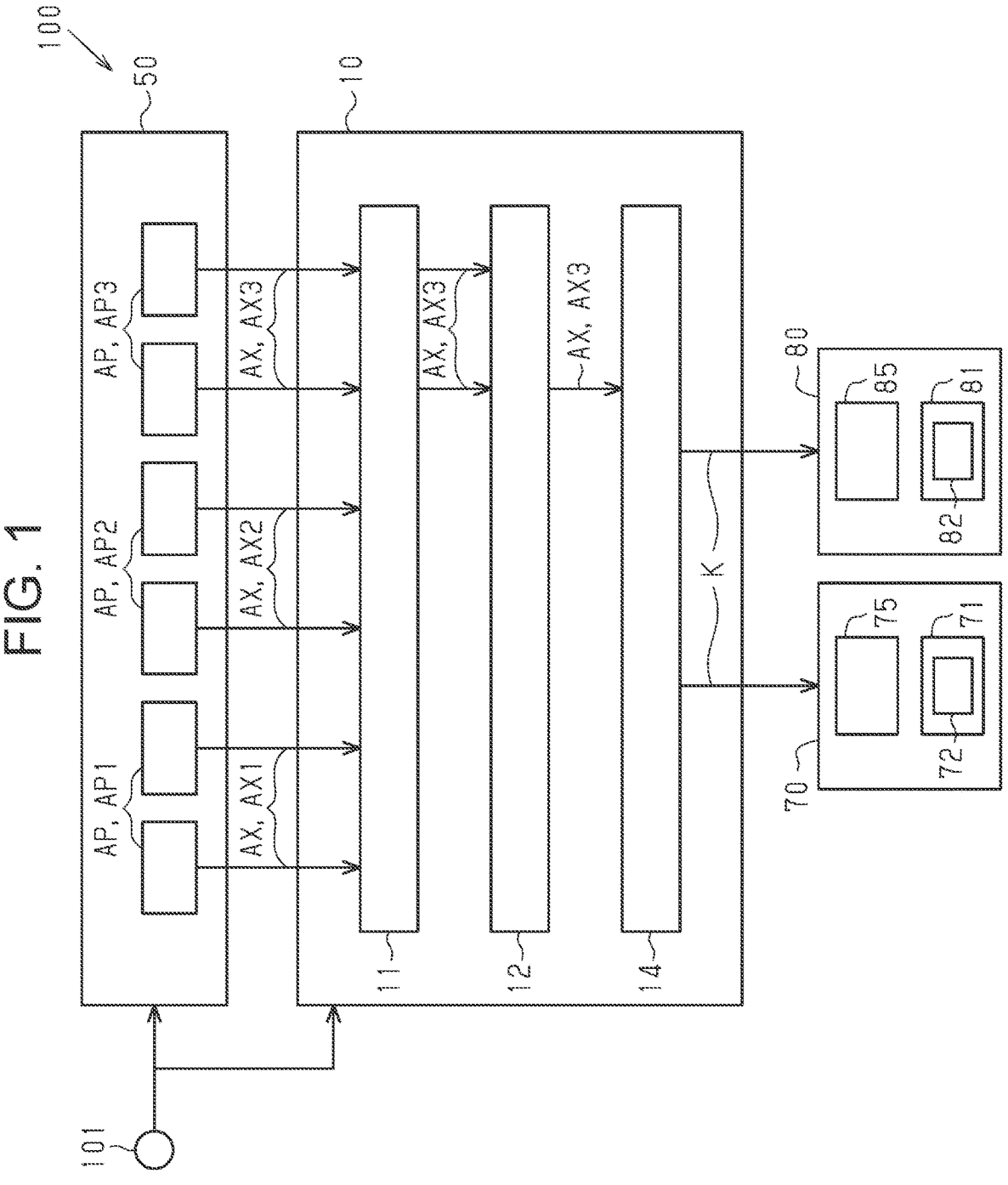
FIG. 1 is a schematic configuration diagram of a vehicle.

As shown in FIG. 1, a vehicle 100 includes a command ECU 50, a management ECU 10, a first actuator system 70, and a second actuator system 80.

The first actuator system 70 includes a plurality of driving units 71 and a first ECU 75 that controls each driving unit 71. In FIG. 1, only one of driving units 71 is shown as a representative. The driving units 71 are a set of devices serving as a driving source of the vehicle 100. One example of the driving units 71 is an engine. The engine includes actuators 72 such as a throttle valve, a fuel injection valve, and an ignition system. The first ECU 75 is a computer including a processing circuit. The processing circuit includes a CPU, a non-volatile memory, and a volatile memory. The non-volatile memory stores in advance various programs in which processes to be executed by the CPU are written. The first ECU 75 controls the actuator 72 of each driving unit 71 based on a specified value from a superordinate device, for example, the management ECU 10. A driving force is generated in the vehicle 100 according to the control of the actuator 72 by the first ECU 75. Thus, the first actuator system 70 includes the actuator 72. Each driving unit 71 is equipped with various sensors for grasping operating states of portions including the actuator 72. The first ECU 75 acquires detection values of these various sensors on a timely basis. Based on pieces of information including those acquired from the various sensors, the first ECU 75 detects a malfunction in the driving units 71 when it occurs.

The second actuator system 80 includes a plurality of brake units 81 and a second ECU 85 that controls each brake unit 81. In FIG. 1, only one of brake units 81 is shown as a representative. The brake units 81 are a set of devices that brake the vehicle 100. One example of the brake units 81 is a hydraulic brake device. The hydraulic brake device includes a brake pad that is pressed against a wheel according to a hydraulic pressure, and an actuator 82 that applies a hydraulic pressure to the brake pad. The second ECU 85 is a computer including a processing circuit. The processing circuit includes a CPU, a non-volatile memory, and a volatile memory. The non-volatile memory stores in advance various programs in which processes to be executed by the CPU are written. The second ECU 85 controls the actuator 82 of each brake unit 81 based on a specified value from a superordinate device, for example, the management ECU 10. A braking force is generated in the vehicle 100 according to the control of the actuator 82 by the second ECU 85. Thus, the second actuator system 80 includes the actuator 82. Each brake unit 81 is equipped with various sensors for grasping operating states of portions including the actuator 82. The second ECU 85 acquires detection values of these various sensors on a timely basis. Based on pieces of information including those acquired from the various sensors, the second ECU 85 detects a malfunction of each brake unit 81 when it occurs.

While this is not shown, the vehicle 100 includes also other actuator systems than the first actuator system 70 and the second actuator system 80. One example of the other actuator systems is a steering system that adjusts a steering angle of a steering wheel of the vehicle 100.

Schematic Configuration of Command ECU

The command ECU 50 is a computer including a processing circuit. The processing circuit includes a CPU, a non-volatile memory, and a volatile memory. The non-volatile memory stores in advance various programs in which processes to be executed by the CPU are written. One example of the programs stored in the non-volatile memory is a plurality of applications AP for controlling the motion of the vehicle 100. The command ECU 50 functions as an execution device that executes the applications AP stored in itself. When executing a certain application AP, the command ECU 50 outputs a motion request of the application AP to be executed. In some cases, the command ECU 50 executes a plurality of applications AP at the same time. The motion request includes an acceleration request value CY that is a request value of acceleration to be generated in the vehicle 100. The acceleration request value CY assumes a positive or negative value. The command ECU 50 handles acceleration when the vehicle 100 accelerates forward as a positive value. Hereinafter, a content in which the actor is actually the command ECU 50 may be described with the application AP to be executed as the actor. For example, the acceleration request value CY from the command ECU 50 may be expressed as the acceleration request value CY from the application AP, or receiving the acceleration request value CY from the command ECU 50 may be expressed as receiving the acceleration request value CY from the application AP.

The applications AP stored in the command ECU 50 are each allocated one of five driver assistance levels LY. Of the five driver assistance levels LY, the lowest level and the highest level are specified as "1" and "5," respectively. Hereinafter, the driver assistance level LY allocated to an application AP may be expressed as the driver assistance level LY associated with an application AP.

An application AP with the driver assistance level LY of "1" controls either acceleration or steering of the vehicle 100 on the premise that the actor in driving is a person. Examples of applications AP with the driver assistance level LY of "1" include an application AP that autonomously follows a preceding vehicle and an application AP that autonomously applies sudden braking. An application AP with the driver assistance level LY of "2" controls acceleration and steering of the vehicle 100 under supervision by a person under limited circumstances. One example of applications AP with the driver assistance level LY of "2" is an application AP that autonomously parks the vehicle. Under the control by these applications AP with the driver assistance level LY of "1" or "2," the actor in driving is the driver. Thus, applications AP with the driver assistance level LY of "1" or "2" provide driver assistance.

An application AP with the driver assistance level LY of "3" controls acceleration and steering of the vehicle 100 almost without requiring management by the driver under limited circumstances. During the control by an application AP with the driver assistance level LY of "3," the driver is allowed so-called "eyes-off" of looking away from the traveling conditions of the vehicle 100. One example of applications AP with the driver assistance level LY of "3" is an application AP that autonomously drives on expressways. An application AP with the driver assistance level LY of "4" controls acceleration and steering of the vehicle 100 without requiring a driver under limited circumstances. An application AP with the driver assistance level LY of "5" always controls acceleration and steering of the vehicle 100 without requiring a driver. Under the control by these applications AP with the driver assistance levels LY of "3" to "5," the actor in driving is the applications AP.

One of the applications AP stored in the command ECU 50 is a first application AP1 associated with the driver assistance level LY of "1." Another of the applications AP stored in the command ECU 50 is a second application AP2 associated with the driver assistance level LY of "2." Yet another of the applications AP stored in the command ECU 50 is a third application AP3 associated with the driver assistance level LY of "3." On the other hand, none of the applications AP stored in the command ECU 50 is associated with the driver assistance level LY of "4" or "5." The highest level of the driver assistance levels LY of the applications AP stored in the command ECU 50 will be referred to as the highest assistance level. The highest assistance level is the highest level of the driver assistance levels LY associated with the respective applications AP that the vehicle 100 has. In this embodiment, the highest assistance level is "3." The command ECU 50 stores, for example, a plurality each of first applications AP1, second applications AP2, and third applications AP3. In the example of FIG. 1, two applications AP of each type are shown as representatives.

The command ECU 50 acquires information from a plurality of information acquisition devices 101 installed in the vehicle 100 on a timely basis. The information acquisition devices 101 include various sensors that acquire information about the vehicle 100 and various switches that acquire instructions from the driver. In FIG. 1, only one of information acquisition devices 101 is shown as a representative. One example of the information acquisition devices 101 is a device that detects a traveling state of the vehicle 100, for example, a traveling velocity of the vehicle 100. Another example of the information acquisition devices 101 is a device that detects information on the surroundings of the vehicle 100, for example, a camera and a radar. Another example of the information acquisition devices 101 is a device that detects the coordinates of the current position of the vehicle 100. Another example of the information acquisition devices 101 is an ignition switch for the driver to order the vehicle 100 to start. The ignition switch is sometimes called a start switch, a system start-up switch, etc. Another example of the information acquisition devices 101 is a switch for the driver to order execution of each application AP. In executing applications AP, the command ECU 50 refers to information acquired from these information acquisition devices 101.

Schematic Configuration of Management ECU

Figure 2:
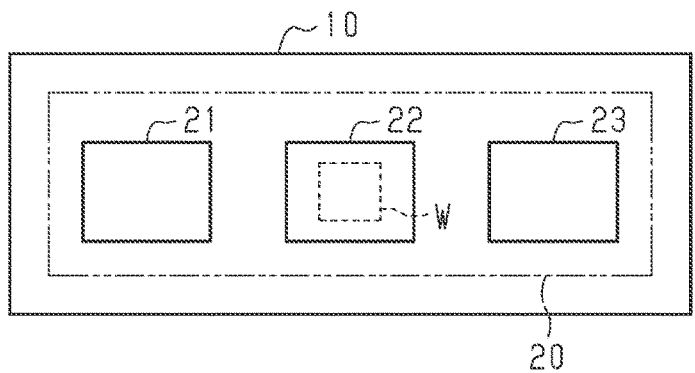
FIG. 2 is a schematic configuration diagram of a management ECU.

As shown in FIG. 2, the management ECU 10 is a computer including a processing circuit 20. The processing circuit 20 includes a CPU 21, a non-volatile memory 22, and a volatile memory 23. The non-volatile memory 22 stores in advance various programs W in which processes to be executed by the CPU 21 are written. The management ECU 10 can exchange information with the command ECU 50 and the ECU of each actuator system through an internal bus (not shown).

The management ECU 10 acquires information on whether there is a malfunction in portions of the vehicle 100 on a timely basis. The information on whether there is a malfunction is sent from ECUs that control portions of the vehicle 100, for example, the first ECU 75 and the second ECU 85. Like the command ECU 50, the management ECU 10 acquires also information from the plurality of information acquisition devices 101 installed in the vehicle 100 on a timely basis. Based on the information sent from the information acquisition devices 101, the management ECU 10 also determines whether there is a malfunction in the information acquisition devices 101. The management ECU 10 manages the pieces of information thus grasped on whether there is a malfunction in portions of the vehicle 100 as an aggregation of vehicle malfunction information. The management ECU 10 always stores the latest vehicle malfunction information while updating the contents of the vehicle malfunction information on a timely basis. As described above, each portion of the vehicle 100 in the vehicle malfunction information includes the information acquisition device 101 that acquires information needed to execute an application AP. Further, each portion of the vehicle 100 in the vehicle malfunction information includes an actuator system that realizes a motion request of an application AP. In addition, each portion of the vehicle 100 in the vehicle malfunction information also includes various units that fulfil functions needed for the vehicle 100 to travel, other than the information acquisition devices 101 and the actuator systems.

As the CPU 21 of the management ECU 10 executes the programs W stored in the non-volatile memory 22, the management ECU 10 functions as a motion manager that manages a motion of the vehicle 100 requested by the application AP. Thus, the management ECU 10 is the actor in controlling in the control method of the vehicle 100. In the following, processing for which the management ECU 10 is responsible will be described with a focus on the acceleration request values CY in motion requests from applications AP.

The management ECU 10 can execute a management process of comprehensively managing the acceleration request values CY from the applications AP. As shown in FIG. 1, by executing the programs W, the management ECU 10 functions as a reception unit 11, an acceleration arbitration unit 12, and an output unit 14 for realizing the management process. The reception unit 11 receives the acceleration request values CY from the respective applications AP. The acceleration request value CY from each application AP is associated with information indicating the driver assistance level LY allocated to that application AP. The reception unit 11 further selects the highest driver assistance level LY of the driver assistance levels LY received. Hereinafter, the driver assistance level LY selected by the reception unit 11 will be referred to as a selected level LZ. The acceleration arbitration unit 12 selects the smallest acceleration request value CY of the acceleration request values CY that are associated with the selected level LZ. Hereinafter, the acceleration request value CY selected by the acceleration arbitration unit 12 will be referred to as a selected acceleration CZ. The output unit 14 basically outputs an application-specified value K that is a specified value according to the selected acceleration CZ to the actuator systems 70, 80. In some cases, the output unit 14 may stop the output of the application-specified value K under a condition according to the selected level LZ.

Stopping Condition

The condition for the output unit 14 to stop the output of the application-specified value K will be referred to as a stopping condition. When this stopping condition is met, the output unit 14 stops the output of the application-specified value K. The stopping condition is specified in advance for each driver assistance level LY.

The stopping condition applicable to the first application AP1 with the driver assistance level LY of "1" is that there is a malfunction in the vehicle 100. The stopping condition applicable to the second application AP2 with the driver assistance level LY of "2" is that there is a malfunction in the vehicle 100 and that, moreover, the traveling state of the vehicle 100 is a predetermined specific state. The specific state in this embodiment is a state where the traveling velocity of the vehicle 100 is within a predetermined velocity range. There is no stopping condition applicable to the third application AP 3 with the driver assistance level LY of "3." That is, regarding stopping the output of the application-specified value K, when the selected level LZ is "3" that is the highest assistance level of the applications AP stored in the command ECU 50, the output unit 14 continues and not stops the output of the application-specified value K even when there is a malfunction in the vehicle 100. In this embodiment, while the command ECU 50 does not store applications AP with the driver assistance levels LY of "4" and "5," there are no stopping conditions applicable to applications AP with the driver assistance levels LY of "4" and "5," either. On the other hand, as described in connection with the stopping condition for the first application AP1 or the second application AP2, when the selected level LZ is a specific level that is lower than "3," the output unit 14 stops the output of the application-specified value K on the condition that a malfunction has occurred in the vehicle 100. The stopping condition for the second application AP2 is the stopping condition for the first application AP1 plus the requirement about the traveling state of the vehicle 100. Accordingly, the stopping condition for the second application AP2 is more difficult to meet than the stopping condition for the first application AP1. Thus, in stopping the output of the application-specified value K, the output unit 14 sets a stricter stopping condition when the selected level LZ is higher.

Regarding a malfunction in the vehicle 100 relating to the stopping condition, the output unit 14 of this embodiment deals as follows. When there is a malfunction at any portion of the vehicle 100 in the vehicle malfunction information, the output unit 14 deals on the assumption that there is a malfunction in the vehicle 100. On the other hand, when there is no malfunction at any portion of the vehicle 100, the output unit 14 deals on the assumption that there is no malfunction in the vehicle 100.

Degradation Value

As described above, the output unit 14 stops the output of the application-specified value K when the stopping condition according to the selected level LZ is met. In this case, the output unit 14 calculates a degradation value obtained by bringing the selected acceleration CZ closer to a predetermined end value as time passes. At the same time, the output unit 14 outputs, instead of the application-specified value K according to the selected acceleration CZ, a specified value according to the degradation value as the application-specified value K. When the degradation value reaches the end value, the output unit 14 ends the output of the application-specified value K. In this way, the output unit 14 of this embodiment stops the output of the application-specified value K by bringing the selected acceleration CZ closer to the predetermined end value as time passes using a degradation value. Here, the application AP that has output the selected acceleration CZ will be referred to as a selected application. As described above, the initial value of the degradation value is the acceleration request value CY from the selected application. As will be described later, the end value of the degradation value is a value that is determined according to instructions from the selected application. That is, the degradation value is an acceleration request value CY from the selected application that the management ECU 10, in place of the command ECU 50, has calculated in accordance with a predetermined rule between the initial value and the end value that reflect the characteristics of the selected application. Such a degradation value can be called one type of the acceleration request value CY from the selected application, i.e., the selected acceleration CZ.

Management Process

The management process will be described in detail. As the premise, the command ECU 50 executes each application AP as needed on a timely basis from when the ignition switch of the vehicle 100 is turned on until it is turned off. During execution of a specific application AP, the command ECU 50 repeatedly outputs the acceleration request value CY of the application AP being executed to the management ECU 10 on a predetermined cycle. As described above, this acceleration request value CY is associated with the driver assistance level LY allocated to the application AP being executed. Further, the acceleration request value CY is associated with information on degradation characteristics relating to the application AP being executed. The information on the degradation characteristics is information about to what magnitude the acceleration request value CY should be degraded, i.e., basic information for calculating the end value. As output data from the application AP being executed, the command ECU 50 outputs a set of data composed of the acceleration request value CY and the above-described pieces of information associated with it to the management ECU 10. Hereinafter, this set of data will be referred to as application data AX. As described above, in some cases, the command ECU 50 executes a plurality of applications AP at the same time. In this case, the command ECU 50 outputs a plurality of sets of application data AX to the management ECU 10 at the same time. There is no information on degradation characteristics in application data AX of applications AP for which there is no stopping condition.

When an execution condition is met from when the ignition switch of the vehicle 100 is turned on until it is turned off, the management ECU 10 starts the management process. The execution condition is that the command ECU 50 is executing one or more applications AP.

Figure 3:
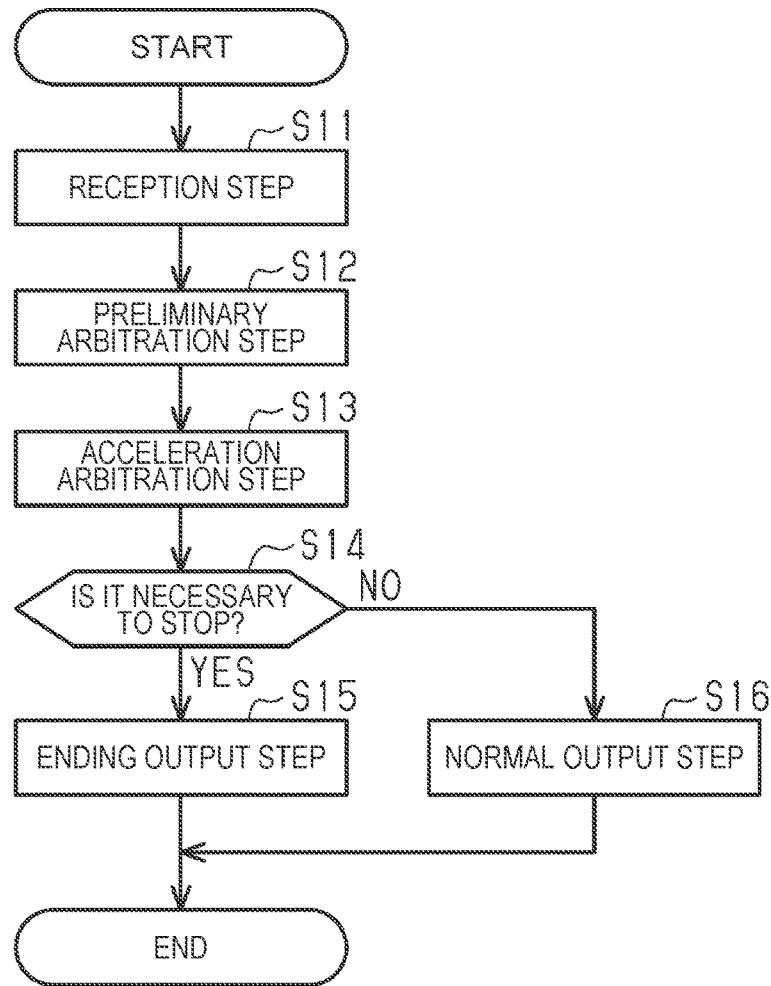
FIG. 3 is a flowchart showing a processing procedure of a management process.

As shown in FIG. 3, in the management process, the management ECU 10 first performs the process of step S11. In step S11, the reception unit 11 performs a reception step. In the reception step, as shown in FIG. 1, the reception unit 11 receives sets of application data AX from the respective applications AP. In FIG. 1, an example in which two applications AP of each type are being executed is shown. In the reception step, the reception unit 11 sometimes receives a plurality of sets of application data AX and sometimes receives only one set and not a plurality of sets of application data AX. Hereinafter, a case where the reception unit 11 receives a plurality of sets of application data AX will be referred to as a multiple case, and a case where the reception unit 11 receives only one set of application data AX will be referred to as a single case. As shown in FIG. 3, when the reception unit 11 has received the sets of application data AX from the respective applications AP, the reception unit 11 moves the processing to step S12.

In step S12, the reception unit 11 performs a preliminary arbitration step. The following is based on the assumption of the multiple case. In the preliminary arbitration step, the reception unit 11 first refers to the driver assistance levels LY included in the respective sets of application data AX received in step S11. Then, the reception unit 11 performs arbitration for the plurality of driver assistance levels LY referred to. In particular, the reception unit 11 selects, as the selected level LZ, the driver assistance level LY of the largest value of the driver assistance levels LY in the plurality of sets of application data AX. Then, the reception unit 11 outputs the sets of application data AX including the selected level LZ to the acceleration arbitration unit 12. Here, the reception unit 11 sometimes outputs a plurality of sets of application data AX to the acceleration arbitration unit 12 and sometimes outputs only one set of application data AX to the acceleration arbitration unit 12. In particular, in the case where there is a plurality of sets of application data AX including the selected level LZ, i.e., the case of a first case to be described later, the reception unit 11 outputs these sets of application data AX to the acceleration arbitration unit 12. Here, an application AP associated with the selected level LZ will be referred to as a specific application. The first case is a case where the command ECU 50 is executing a plurality of specific applications and the reception unit 11 has received application data AX from a plurality of specific applications in step S11. On the other hand, in the case where, as a result of performing arbitration for the driver assistance level LY, there is only one set of application data AX including the selected level LZ, i.e., the case of a second case to be described later, the reception unit 11 outputs the only one set of application data AX to the acceleration arbitration unit 12. The second case is a case where the command ECU 50 is executing one specific application and not a plurality of specific applications, and the reception unit 11 has received the application data AX from the one specific application in step S11. Also in the case of this single case, the reception unit 11 outputs only one set of application data AX to the acceleration arbitration unit 12. As shown in FIG. 3, when the reception unit 11 has output the application data AX including the selected level LZ, the reception unit 11 moves the processing to step S13. By outputting the application data AX including the selected level LZ to the acceleration arbitration unit 12, the reception unit 11 outputs the acceleration request values CY associated with the selected level LZ to the acceleration arbitration unit 12.

In step S13, the acceleration arbitration unit 12 performs an acceleration arbitration step. In this acceleration arbitration step, the acceleration arbitration unit 12 first refers to the acceleration request values CY included in the respective sets of application data AX having been output from the reception unit 11. Then, the acceleration arbitration unit 12 performs arbitration for the plurality of acceleration request values CY referred to. In particular, the acceleration arbitration unit 12 selects, as the selected acceleration CZ, the acceleration request value CY of the smallest value of the acceleration request values CY in the plurality of sets of application data AX. The acceleration arbitration unit 12 selects, as the selected acceleration CZ, the acceleration request value CY of the smallest value of the acceleration request values CY associated with the selected level LZ. As shown in FIG. 1, when the acceleration arbitration unit 12 has specified the selected acceleration CZ, the acceleration arbitration unit 12 outputs the application data AX including this selected acceleration CZ to the output unit 14. In the case where the reception unit 11 has output only one set of application data AX, the acceleration arbitration unit 12 outputs that application data AX to the output unit 14. As shown in FIG. 3, when the acceleration arbitration unit 12 has output the application data AX to the output unit 14, the acceleration arbitration unit 12 moves the processing to step S14.

In step S14, the output unit 14 performs a determination step. In particular, the output unit 14 determines whether it is necessary to stop the output of the application-specified value K. To perform the determination on the necessity, the output unit 14 refers to the selected level LZ included in the application data AX having been output from the acceleration arbitration unit 12. Then, the output unit 14 performs the determination on the necessity based on this selected level LZ. When the selected level LZ included in the application data AX is "1" or "2," the output unit 14 determines whether the stopping condition already described is met. For example, when the selected level LZ is "1," the output unit 14 refers to the vehicle malfunction information at the current point. When there is a malfunction in the vehicle 100, as this means that the stopping condition is met, the output unit 14 determines that it is necessary to stop the output of the application-specified value K. On the other hand, when there is no malfunction in the vehicle 100, as this means that the stopping condition is not met, the output unit 14 determines that it is not necessary to stop the output of the application-specified value K. When the selected level LZ is "2," the output unit 14 refers to the traveling velocity of the vehicle 100 at the current point in addition to whether there is a malfunction in the vehicle 100. When the stopping condition is met, the output unit 14 determines that it is necessary to stop the output of the application-specified value K, and when the stopping condition is not met, the output unit 14 determines that it is not necessary to stop the output of the application-specified value K. When the selected level LZ is "3," the output unit 14 always determines that it is not necessary to stop the output of the application-specified value K. When, as a result of performing the determination on the necessity as has been described above, the output unit 14 determines that it is not necessary to stop the output of the application-specified value K (step S14: NO), the output unit 14 moves the processing to step S16.

In this case, in step S16, the output unit 14 performs a normal output step. In this normal output step, the output unit 14 first refers to the selected acceleration CZ included in the application data AX having been output from the acceleration arbitration unit 12. Then, the output unit 14 calculates the application-specified value K that is a specified value according to the selected acceleration CZ. To calculate the application-specified value K, the output unit 14 first determines allocations of the selected acceleration CZ to the first actuator system 70 and the second actuator system 80. Then, the output unit 14 converts the values of the selected acceleration CZ respectively allocated to these systems into a unit of force. The output unit 14 calculates the values thus obtained as the application-specified values K. When the selected acceleration CZ is a positive value, the output unit 14 calculates the application-specified value K such that the driving force of the vehicle 100 becomes higher as the selected acceleration CZ becomes higher. When the selected acceleration CZ is a negative value, the output unit 14 calculates the application-specified value K such that the braking force of the vehicle 100 becomes higher as the selected acceleration CZ becomes lower. In this way, the output unit 14 calculates the application-specified values K for the respective actuator systems 70, 80. As shown in FIG. 1, when the output unit 14 has calculated the application-specified values K, the output unit 14 outputs the calculated application-specified values K to the respective actuator systems 70, 80. When the output unit 14 has output the application-specified values K, the output unit 14 ends the process of step S16. Then, as shown in FIG. 3, the management ECU 10 temporarily ends the series of processes of the management process. Thereafter, when the execution condition is met, the management ECU 10 executes the process of S11 again. When the management ECU 10 executes the process of step S11 again via the process of step S16, the management ECU 10 executes step S11 at the following timing. That is, the management ECU 10 ensures that the interval of executing step S11 is, for example, of the same length as the aforementioned predetermined cycle.

On the other hand, when the output unit 14 determines by the determination on the necessity in step S14 that it is necessary to stop the output of the application-specified value K (step S14: YES), the output unit 14 moves the processing to step S15. In this case, the output unit 14 performs an ending output step in step S15. In this ending output step, the output unit 14 repeatedly calculates the degradation value shifting from the selected acceleration CZ to the end value. The method of calculating the degradation value will be described later. The output unit 14 calculates the degradation value, for example, on the aforementioned predetermined cycle. Each time the output unit 14 calculates the degradation value, the output unit 14 calculates the application-specified values K according to the degradation value instead of the selected acceleration CZ. As shown in FIG. 1, each time the output unit 14 calculates the application-specified values K, the output unit 14 outputs the application-specified values K to the respective actuator systems 70, 80. When the degradation value has reached the end value, the output unit 14 stops the output of the application-specified values K to the respective actuator systems 70, 80. When the output unit 14 has stopped the output of the application-specified values K, the role of the actor in driving operation of the vehicle 100 is taken over by the driver. Thereafter, the output unit 14 stands by until a situation where a motion request from an application AP is allowed to be realized arises again, for example, until the driver orders the application AP to be executed. When a situation where a motion request from an application AP is allowed to be realized arises again, the output unit 14 ends the process of step S15. Thereafter, as shown in FIG. 3, the management ECU 10 temporarily ends the series of processes of the management process. When the execution condition is met, the management ECU 10 performs the process of step S11 again.

The method of calculating the degradation value will be described. When the processing has moved to step S15, the output unit 14 first calculates the end value that serves as a final target value in calculating the degradation value. In particular, the output unit 14 refers to the information on the degradation characteristics included in the application data AX having been output from the acceleration arbitration unit 12. Then, the output unit 14 calculates the end value based on the degradation characteristics and a traveling state of the vehicle 100 at the current point. The traveling state of the vehicle 100 is, for example, the traveling velocity of the vehicle 100. When the output unit 14 has ended the calculation of the end value, the output unit 14 starts the calculation of the degradation value. To calculate the degradation value, the output unit 14 refers to the selected acceleration CZ included in the application data AX having been output from the acceleration arbitration unit 12. The output unit 14 handles this selected acceleration CZ as the initial value of the degradation value. To calculate a new degradation value, the output unit 14 adds or subtracts a predetermined value that is specified in advance to or from a previous value of the degradation value. The output unit 14 repeatedly calculates the degradation value until the degradation value becomes the aforementioned predetermined end value. When the degradation value has become the end value, the output unit 14 ends the calculation of the degradation value. In calculating the degradation value, whether to add or subtract the predetermined value to or from the previous value can be determined according to the relationship of magnitude between the selected acceleration CZ serving as the initial value and the end value. That is, when the selected acceleration CZ is lower than the end value, the output unit 14 should add the predetermined value to the previous value. On the other hand, when the selected acceleration CZ is higher than the end value, the output unit 14 should subtract the predetermined value from the previous value.

Workings of Embodiment

Hereinafter, application data AX from a first application AP1 will be referred to as first application data AX1. Application data AX from a second application AP2 will be referred to as second application data AX2. Application data AX from a third application AP3 will be referred to as third application data AX3.

Now, it is assumed that there is a malfunction in the vehicle 100. It is assumed that, in this situation, two each of first applications AP1, second applications AP2, and third applications AP3 are being executed as shown in FIG. 1. In this case, the reception unit 11 receives two sets of first application data AX1, two sets of second application data AX2, and two sets of third application data AX3 from the command ECU 50. When the reception unit 11 has received these six sets of application data AX, the reception unit 11 performs preliminary arbitration for the driver assistance level LY. Since the first applications AP1, the second applications AP2, and the third applications AP3 are targets of the arbitration here, the reception unit 11 selects "3" that is the driver assistance level LY corresponding to the third applications AP3 as the selected level LZ. Then, the reception unit 11 outputs the third application data AX3 including the selected level LZ to the acceleration arbitration unit 12. The reception unit 11 outputs both of the two sets of third application data AX3 to the acceleration arbitration unit 12. In response, the acceleration arbitration unit 12 performs arbitration for the acceleration request values CY included in these two sets of third application data AX3. The acceleration arbitration unit 12 selects, as the selected acceleration CZ, the smaller one of the acceleration request values CY included in the two sets of third application data AX3. When the acceleration arbitration has ended, the output unit 14 specifies how to deal with the output of the application-specified values K to the respective actuator systems 70, 80 based on the selected acceleration CZ and the selected level LZ. First, as the selected level LZ is "3," the output unit 14 determines not to stop the output of the application-specified values K. Then, the output unit 14 generates the application-specified values K according to the selected acceleration CZ. Then, the output unit 14 outputs the application-specified values K to the respective actuator systems 70, 80.

It is assumed that an object involved in the malfunction in the vehicle 100 here is, for example, one of brake units 81 in the second actuator system 80. In this case, the second ECU 85 realizes control according to the application-specified value K using a brake unit 81 that is not malfunctioning. Thus, even when there is a malfunction in the vehicle 100, the acceleration request value CY from the application AP is realized using a substitute on-board component.

In the above, the flow of the management process has been described using, as an example, the case where each of the first applications AP1, the second applications AP2, and the third applications AP3 is being executed. Here, it is also possible, for example, that only a first application AP1 and a second application AP2 are being executed while a third application AP3 is not being executed. In this case, when the reception unit 11 receives application data AX from these applications AP, in the preliminary arbitration, the reception unit 11 selects "2" that is the driver assistance level LY corresponding to the second application AP2 as the selected level LZ. In response, the acceleration arbitration unit 12 performs acceleration arbitration for the second applications AP2.

Advantages of Embodiment (1) In this embodiment, the reception unit 11 preliminarily performs arbitration among driver assistance levels LY before the acceleration arbitration unit 12 arbitrates among acceleration request values CY. The reception unit 11 thereby preliminarily dismisses acceleration request values CY from applications AP with lower driver assistance levels LY. Then, the output unit 14 determines whether it is necessary to stop the output of the application-specified value K, i.e., whether it is necessary to end the control according to the selected acceleration CZ, based on the highest of the driver assistance levels LY which the reception unit 11 has received and among which the reception unit 11 has preliminarily arbitrated. This can prevent the following situation. That is, this can prevent a situation such as where, when the determination on the necessity to end the control should be performed according to a higher level among driver assistance levels LY received by the reception unit 11, the output unit 14 ends the control under a stopping condition according to a lower driver assistance level LY.

(2) In this embodiment, the higher the driver assistance level LY is, the more difficult it is for the stopping condition for stopping the output of the application-specified value K to be met. Therefore, when an application AP with a high driver assistance level LY is included among applications AP that have made acceleration requests, the control according to the selected acceleration CZ is less likely to be ended.

(3) In addition to (2), in this embodiment, there is no stopping condition when the driver assistance level LY is the highest assistance level. That is, when the selected level LZ selected by the reception unit 11 is the highest assistance level, the output unit 14 does not stop the control according to the selected acceleration CZ even when a malfunction occurs in the vehicle 100. Therefore, as described in connection with the workings, when the third application AP3 is included among applications AP that have made acceleration requests, the control according to the selected acceleration CZ selected by the acceleration arbitration unit 12 can be continued even when a malfunction occurs in the vehicle 100.

(4) In this embodiment, in ending the control according to the selected acceleration CZ, the selected acceleration CZ is brought closer to the end value as time passes. When such an aspect is adopted, compared with when the output of the application-specified value K is immediately stopped at the point when processing has moved to the ending output step, for example, changes in the application-specified value K at an ending stage of the control are more gradual. Therefore, when driving operation is taken over by the driver after the control according to the selected acceleration CZ is ended, the behavior of the vehicle 100 is less likely to change suddenly.

Modified Examples

The above-described embodiment can be implemented with changes made thereto as follows. The above-described embodiment and the following modified examples can be implemented in combinations within such a range that no technical inconsistency arises.

Regarding the ending output step, the method of calculating the degradation value is not limited to the example of the above-described embodiment. For example, within one time of the ending output step, the predetermined value used to calculate the degradation value may be gradually increased or decreased. The predetermined value may be set to a different value for each application AP. In the case where the predetermined value is set to a different value for each application, it is conceivable, for example, to include information on the predetermined value in the application data AX from each application AP. In this case, for example, the information on the predetermined value may be included as one piece of information about degradation characteristics. Any technique for calculating the degradation value may be used as long as the acceleration request value CY can be brought closer to the end value as time passes.

Regarding the ending output step, it is not essential to stop the output of the application-specified value K after bringing the selected acceleration CZ closer to the end value as time passes. The output of the application-specified value K may be stopped immediately at the point when processing has moved to the ending output step. In this case, for example, the following aspect is adopted for the ending output step: Without outputting the application-specified value K even once, the output unit 14 continues to stand by until a situation where a motion request from an application AP is allowed to be realized arises again.

A different aspect of stopping the output of the application-specified value K may be adopted for each application AP. For example, for one application AP, the output of the application-specified value K is stopped after the selected acceleration CZ is brought closer to the end value as time passes, whereas for another application AP, the output of the application-specified value K is stopped immediately. To realize such an aspect, it is conceivable, for example, to adopt the following configuration. It is conceivable to include information specifying the aspect of stopping the output of the application-specified value K in the application data AX from an application AP.

The contents of the stopping conditions are not limited to the example of the above-described embodiment. For example, regarding the stopping condition applicable to the second application AP2, a different velocity range may be set for each application AP. In this case, it is conceivable, for example, to include information on the velocity range in the application data from each second application AP2.

Regarding the stopping condition applicable to the second application AP2, the target that defines the specific state of the vehicle 100 is not limited to the traveling velocity of the vehicle 100. The target that defines the specific state may be anything that is involved in traveling of the vehicle 100. For example, the specific state may be defined by a yaw rate of the vehicle 100 or a road gradient at a site where the vehicle 100 is traveling. In the case where such an aspect is adopted, a yaw rate sensor or an acceleration sensor should be installed in the vehicle 100. A necessary information acquisition device should be installed in the vehicle 100 according to the target that defines the specific state. A different target that defines the specific state may be set for each second application AP2.

Regarding the stopping condition applicable to the second application AP2, a plurality of requirements about the traveling state of the vehicle 100 may be set. For example, a requirement about the traveling velocity of the vehicle 100 and another different requirement may be imposed.

A stopping condition applicable to an application AP with the highest assistance level may be set. This stopping condition may include a content that there is a malfunction in the vehicle 100. That is, when the selected level LZ selected by the reception unit 11 is the highest assistance level, the output of the application-specified value K may be stopped in response to the stopping condition including a malfunction in the vehicle 100 being met. In the case where a stopping condition for an application AP with the highest assistance level is set, it is conceivable to set this stopping condition so as to be stricter than the stopping conditions applicable to applications AP with other driver assistance levels LY.

Regarding setting a stricter stopping condition for an application AP with a higher driver assistance level LY, the following aspect has been adopted in the above-described embodiment: As can be seen from a comparison between the stopping conditions for the first application AP1 and the second application AP2 of the above-described embodiment, the stopping condition for the application AP with the higher driving assistance level LY is the stopping condition for the application AP with the lower driving assistance level LY plus another requirement. Other than such an aspect, the following aspect can also realize setting a stricter stopping condition for an application AP with a higher driver assistance level LY: A requirement targeting the same event or the same parameter is made stricter. One example is that, in the case where the traveling velocity of the vehicle 100 is included in the stopping condition, the width of the aforementioned velocity range is set so as to be narrower for a higher driving assistance level LY. Another example is the following aspect using a requirement about a malfunction in the vehicle 100: Among portions of the vehicle 100, a target location of malfunction used for determining that there is a malfunction in the vehicle 100 is specified for each driver assistance level LY. Here, a fewer target locations of malfunction are set for a higher driver assistance level LY. When a malfunction occurs in at least one of the target locations of malfunction, it is determined that there is a malfunction in the vehicle 100. Such an aspect can also set a stricter stopping condition for a higher driver assistance level LY.

The driver assistance levels LY of the applications AP stored in the command ECU 50 are not limited to the example of the above-described embodiment. If the command ECU 50 stores applications AP with a plurality of driver assistance levels LY, the following becomes possible when the command ECU 50 executes these applications AP with the plurality of driver assistance levels LY at the same time: The advantage produced by performing arbitration among driver assistance levels LY before performing acceleration arbitration can be reaped. Regarding the applications AP stored in the command ECU 50, it is possible, for example, that the command ECU 50 stores the first application AP1 and the second application AP2 but does not store the third application AP3. It is also possible that the command ECU 50 stores an application AP with the driver assistance level LY of "4" in addition to the first application AP1, the second application AP2, and the third application AP3. It is also possible that the command ECU 50 further stores an application AP with the driver assistance level LY of "5" in addition to these applications. For example, in the case where the command ECU 50 stores each of applications AP with the driver assistance levels "1" to "5," handling of the stopping condition for the third application AP3 may be either of the following: As in the above-described embodiment, setting of a stopping condition for the third application AP3 may be omitted. Or a stopping condition for the third application AP3 may be set. In that case, the stopping condition may be set so as to be stricter for a higher driver assistance level LY in relation to the stopping condition for the first application AP1 and the stopping condition for the second application AP2.

A stopping condition applicable to an application AP with the driver assistance level LY of "4" may be set, or a stopping condition applicable to an application AP with the driver assistance level LY of "5" may be set. In that case, a stricter stopping condition may be set for an application AP with a higher driver assistance level LY.

It is not essential to set a stricter stopping condition for an application AP with a higher driver assistance level LY. For example, a stopping condition may be set based on a different event or parameter according to the driver assistance level LY. For example, for the stopping condition applicable to the first application AP1, a requirement based on the traveling velocity of the vehicle 100 is set, and for the stopping condition applicable to the second application AP2, a different requirement other than the traveling velocity of the vehicle 100 is set, and so on. As a different example, it is also conceivable to set the stopping conditions as follows: Regarding a requirement about a malfunction in the vehicle 100, a different location is used as the target for determining that there is a malfunction in the vehicle 100 between the stopping condition applicable to the first application AP1 and the stopping condition applicable to the second application AP2. It is conceivable to set an appropriate event or parameter as the target of the stopping condition in consideration of in what situation the output of the application-specified value K should desirably be stopped at each driver assistance level LY.

In the case where the stopping condition is set based on a different event or parameter according to the driver assistance level LY as in the above-described modified example, it is also conceivable, for example, to adopt the following configuration: Among applications AP with the same driver assistance level LY, a stopping condition with a different content is set for each application AP. In this case, some kind of criterion for standardization should be provided by, for example, standardizing the event or parameter used as the target, or setting the difficulty of meeting the stopping condition to an equivalent level, among applications AP with the same driver assistance level LY.

It is not essential to include a requirement of a malfunction in the vehicle 100 in the stopping condition for each driver assistance level LY. Even under circumstances where there is no malfunction in the vehicle 100, if there is a situation where the output of the application-specified value K should be stopped, the stopping condition may be set as appropriate so as to grasp that situation.

The number of the driver assistance levels LY and how to specify the driver assistance levels LY are not limited to the examples of the above-described embodiment. In the case where the number of the driver assistance levels LY is changed from that of the above-described embodiment, as in the above-described embodiment, a stricter stopping condition may be set for an application AP with a higher driver assistance level LY, or setting of a stopping condition may be omitted for an application AP with the highest assistance level. The stopping conditions may be specified in a form different from such an aspect. An appropriate stopping condition may be set according to each driver assistance level LY.

Regarding the acceleration request value CY being associated with the driver assistance level LY, it is not essential that the acceleration request value CY is associated with the driver assistance level LY in the date itself that is output from the application AP as in the above-described embodiment. For example, the following aspect is also included in the aspect of the acceleration request value CY being associated with the driver assistance level LY: As the premise, the management ECU 10 stores a correspondence list in which identification values of the respective applications AP and the driver assistance levels LY of the respective applications AP correspond to each other. To this management ECU 10, an application AP outputs the application data AX including the acceleration request value CY and its own identification value. Upon receiving the application data AX, the management ECU 10 determines the driver assistance level LY of the application AP based on the identification value sent from the application AP and the correspondence list. Then, the management ECU 10 associates the acceleration request value CY with the determined driver assistance level LY. The reception unit 11 may receive the acceleration request value CY that has been subjected to such preliminary processing.

Instead of the configuration in which the command ECU 50 and the management ECU 10 are separate processing devices, a configuration may be adopted in which one processing device fulfils the functions of the command ECU 50 and the management ECU 10. Similarly, a configuration may be adopted in which, for example, the ECU of the actuator system fulfils the function of the management ECU 10.

The processing circuit 20 of the management ECU 10 may have one of the following configurations (a) to (c). The same applies to the processing circuits of other ECUs, for example, the command ECU 50.

(a) The processing circuit 20 includes one or more processors that execute various processes in accordance with computer programs. Each processor includes a CPU as well as a memory, such as an RAM and an ROM. The memory stores program codes or commands configured to make the CPU execute processes. The term "memory," i.e., "computer-readable medium" covers all available media that can be accessed by a general-purpose or special-purpose computer.

(b) The processing circuit 20 includes one or more dedicated hardware circuits that execute various processes. Examples of dedicated hardware circuits include an integrated circuit for a specific application, i.e., an ASIC, and an FPGA. ASIC stands for "Application Specific Integrated Circuit," and FPGA stands for "Field-Programmable Gate Array."

(c) The processing circuit 20 includes a processor that executes some of various processes in accordance with computer programs, and a dedicated hardware circuit that executes the other processes of the various processes.

Supplements

The above-described embodiment and modified examples may include the configurations described in the following supplements.

Supplement 1

The motion manager of a vehicle may execute the following: receiving acceleration request values from a plurality of applications and driver assistance levels associated with the respective acceleration request values; selecting the highest driver assistance level of the driver assistance levels received; selecting the smallest acceleration request value of the acceleration request values associated with the selected driver assistance level; and while outputting a specified value according to the selected acceleration request value to an actuator of the vehicle, stopping the output of the specified value under a condition according to the selected driver assistance level.

Supplement 2

The motion manager of a vehicle described in Supplement 1 may, in stopping the output of the specified value, set a stricter condition for stopping the output of the specified value when the selected driver assistance level is higher.

Supplement 3

The motion manager of a vehicle described in Supplement 2 may, in stopping the output of the specified value, when the selected driver assistance level is the highest of the driver assistance levels associated with the respective applications that the vehicle has, continue and not stop the output of the specified value even when a malfunction occurs in the vehicle, and when the selected driver assistance level is a specific level that is lower than the highest level, stop the output of the specified value on the condition that a malfunction occurs in the vehicle.

Supplement 4

The motion manager of a vehicle described in any one of Supplement 1 to Supplement 3 may stop the output of the specified value, when the condition according to the selected driver assistance level is met, by bringing the selected acceleration request value closer to a predetermined end value as time passes.

What is claimed is:

1. A motion manager for a vehicle, the motion manager comprising one or more processors configured to:

receive, from each of a plurality of applications, acceleration request values and an associated driver assistance level;

select, from among the received driver assistance levels, a selected highest driver assistance level;

identify a subset of the received acceleration request values that are provided by the applications having the selected driver assistance level;

select, from the subset of the received acceleration request values, a smallest acceleration request value;

output a specified value for an actuator of the vehicle based on the selected smallest acceleration request value; and stop the output of the specified value under a condition according to the selected highest driver assistance level.

2. The motion manager according to claim 1, wherein, regarding stopping the output of the specified value, a stricter condition for stopping the output of the specified value is set when the selected driver assistance level is higher.

3. The motion manager according to claim 2, wherein:

regarding stopping the output of the specified value, the one or more processors are configured to, when the selected driver assistance level is the highest of the driver assistance levels associated with the respective applications that the vehicle has, continue and not stop the output of the specified value even when a malfunction is present in the vehicle; and regarding stopping the output of the specified value, the one or more processors are configured to, when the selected driver assistance level is a specific level that is lower than the highest level, stop the output of the specified value on a condition that a malfunction occurs in the vehicle.

4. The motion manager according to claim 1, wherein the one or more processors are configured to stop the output of the specified value, when the condition according to the selected driver assistance level is met, by bringing the selected acceleration request value closer to a predetermined end value as time passes.

5. A control method for a vehicle, the control method being executed by one or more processors in a computer installed in the vehicle, the control method comprising:

receiving, from each of a plurality of applications, acceleration request values and an associated driver assistance level;

selecting, from among the received driver assistance levels, a selected highest driver assistance level;

identifying a subset of the received acceleration request values that are provided by the applications having the selected driver assistance level;

selecting, from the subset of the received acceleration request values, a smallest acceleration request value;

outputting a specified value for an actuator of the vehicle based on the selected smallest acceleration request value; and stopping the output of the specified value under a condition according to the selected highest driver assistance level.

6. A non-transitory storage medium storing instructions that are executable by one or more processors in a computer installed in a vehicle and that cause the one or more processors to perform the following functions comprising:

receiving, from each of a plurality of applications, acceleration request values and an associated driver assistance level;

selecting, from among the received driver assistance levels, a selected highest driver assistance level;

identifying a subset of the received acceleration request values that are provided by the applications having the selected driver assistance level;

selecting, from the subset of the received acceleration request values, a smallest acceleration request value;

outputting a specified value for an actuator of the vehicle based on the selected smallest acceleration request value; and stopping the output of the specified value under a condition according to the selected highest driver assistance level.

* * * * *